US008347307B2

(12) United States Patent
Dawson et al.

(10) Patent No.: US 8,347,307 B2
(45) Date of Patent: Jan. 1, 2013

(54) METHOD AND SYSTEM FOR COST AVOIDANCE IN VIRTUALIZED COMPUTING ENVIRONMENTS

(75) Inventors: Christopher J. Dawson, Arlington, VA (US); Carl P. Gusler, Austin, TX (US); Rick A. Hamilton, II, Charlottesville, VA (US); James W. Seaman, Falls Church, VA (US)

(73) Assignee: International Business Machines Corporation, Armonk, NY (US)

(*) Notice: Subject to any disclaimer, the term of this patent is extended or adjusted under 35 U.S.C. 154(b) by 1330 days.

(21) Appl. No.: 12/046,759

(22) Filed: Mar. 12, 2008

(65) Prior Publication Data

US 2009/0235265 A1    Sep. 17, 2009

(51) Int. Cl.
*G06F 9/46* (2006.01)
(52) U.S. Cl. .................................. 718/105; 718/104
(58) Field of Classification Search .................. 718/104, 718/105
See application file for complete search history.

(56) References Cited

U.S. PATENT DOCUMENTS

| | | | |
|---|---|---|---|
| 6,678,371 B1 * | 1/2004 | Flockhart et al. | 379/265.02 |
| 6,973,654 B1 * | 12/2005 | Shutt et al. | 718/105 |
| 7,174,379 B2 | 2/2007 | Agarwal et al. | |
| 7,523,454 B2 * | 4/2009 | Romero et al. | 718/105 |
| 7,849,347 B2 * | 12/2010 | Armstrong et al. | 713/500 |
| 7,877,754 B2 * | 1/2011 | Birkestrand et al. | 718/104 |
| 7,921,424 B2 * | 4/2011 | Shutt et al. | 718/105 |
| 2002/0091786 A1 * | 7/2002 | Yamaguchi et al. | 709/213 |
| 2002/0129127 A1 * | 9/2002 | Romero et al. | 709/220 |
| 2004/0210623 A1 | 10/2004 | Hydrie et al. | |
| 2005/0044228 A1 * | 2/2005 | Birkestrand et al. | 709/226 |
| 2005/0198303 A1 | 9/2005 | Knauerhase et al. | |
| 2007/0027973 A1 | 2/2007 | Stein et al. | |
| 2008/0034093 A1 * | 2/2008 | Sutou | 709/226 |
| 2008/0256321 A1 * | 10/2008 | Armstrong et al. | 711/173 |
| 2008/0320269 A1 * | 12/2008 | Houlihan et al. | 711/203 |
| 2009/0013153 A1 * | 1/2009 | Hilton | 712/29 |

OTHER PUBLICATIONS

Khanna, G. et al., "Application Performance Management in Virtualized Server Environments", 2006, IEEE, pp. 373-381.
Adams, K. et al., "A Comparison of Software and Hardware Techniques for x86 Virtualization", ASPLOS '06, Oct. 21-25, 2006, pp. 2-13.
Alpern, B. et al., "PDS: A Virtual Execution Environment for Software Deployment", VEE '05, Jun. 11-12, 2005, pp. 175-185.
Jones, R., "ALSTOM Creates a Virtual World", Oct. 18-20, 2005.

* cited by examiner

*Primary Examiner* — Aimee Li
(74) *Attorney, Agent, or Firm* — Anna Linne; Roberts Mlotkowski Safran & Cole, P.C.

(57) ABSTRACT

A method includes monitoring a utilization amount of resources within logical partitions (LPARs) of a plurality of servers and identifying a resource-strained server of the plurality of servers, wherein the resource-strained server includes a plurality of LPARs. Additionally, the method includes determining a migration of one or more LPARs of the plurality of LPARs of the resource-strained server and migrating the one or more LPARs of the resource-strained server to another server of the plurality of servers based on the determining to avoid an activation of capacity upgrade on demand (CUoD).

22 Claims, 7 Drawing Sheets

METHOD AND SYSTEM FOR COST AVOIDANCE IN VIRTUALIZED COMPUTING ENVIRONMENTS

FIELD OF THE INVENTION

The invention generally relates to a system and method for cost avoidance, and, more particularly, to a system and method for cost avoidance in virtualized computing environments.

BACKGROUND OF THE INVENTION

In computing, virtualization refers to the abstraction of computer resources. One useful definition is a technique for hiding the physical characteristics of computing resources from the way in which other systems, applications, or end users interact with those resources. This includes making a single physical resource (such as a server, an operating system, an application, or storage device) appear to function as multiple logical resources; or it can include making multiple physical resources (such as storage devices or servers) appear as a single logical resource. It can also include making one physical resource to appear, with somewhat different characteristics, as one logical resource.

A logical partition, commonly called an LPAR, is a subset of a computer's hardware resources, virtualized as a separate computer. In effect, a physical machine can be partitioned into multiple LPARs, each housing a separate operating system.

Logical partitioning is performed mostly on the hardware layer. For example, two LPARs may access memory from a common memory chip, provided that the ranges of addresses directly accessible to each do not overlap. One partition may indirectly control memory of a second partition, but only by commanding a process of the second partition to directly operate on the memory.

In the past, each CPU was dedicated to a single LPAR, but with the introduction of micro-partitioning, one CPU can be shared between separate LPARs. Micro-partitioning is a form of logical partitioning, and more specifically, micro-partitions are dynamic logical partitions (DLPARs) which run in the shared processor pool (SPP) and which share physical processors rather than have them dedicated. Dynamic logical partitioning is a capability of an LPAR to be reconfigured dynamically without shutting it down. Dynamic logical partitioning enables, e.g., memory, CPU capacity, and I/O interfaces to be moved between LPARs. The SPP can support up to ten times as many operating system images as there are physical processors. Also, there is no binding between OS images and physical processors; instead, e.g., a Hypervisor™ allocates processing resources according to scheduling rules defined when creating the partition. (Hypervisor is a trademark of International Business Machines Corporation in the United States, other countries, or both.) That is, for example, the Hypervisor (or a virtual machine monitor) is a virtualization platform that allows multiple operating systems to run on a host computer at the same time. Additionally, the Hypervisor is a function of the system firmware and may be present on servers whether partitioning is being used or not.

With the advent of computer logical partitioning and virtualization technology it is possible to use computer equipment in a much more efficient and cost effective manner than has been attainable in the past. It is now possible to have a single physical server partitioned into multiple logical servers, each of which appears to applications, users, and administrators as a physical stand-alone computer. Using technology such as IBM® Virtual I/O Server (VIOS), it is further possible to represent physical devices such as network adapters and disks as a collection of logical devices within each logical partition. (IBM is a registered trademark of International Business Machines Corporation in the United States, other countries, or both.)

Additionally, both logical and physical resources on IBM System p™ servers and partitions can be dynamically added, deleted, and moved within the hosting physical server. (System p is a trademark of International Business Machines Corporation in the United States, other countries, or both.) Another consideration is that servers, such as IBM System p, are often purchased with IBM Capacity Upgrade on Demand (CUoD), whereby, excess capacity such as CPU and memory is built into the physical server, but is not active until the client decides to enable them, e.g., either automatically or manually. CUoD allows for much quicker upgrades because the processors are already present on the server in an inactive state. In order to activate CUoD, a user may either rent, lease or buy the CUoD from, e.g., a service provider. Finally, with the introduction of IBM POWER6™ technology, it is possible for the first time to move live UNIX® applications and workloads between physical servers with no outage or interruption of service. (POWER6 is a trademark of International Business Machines Corporation in the United States, other countries, or both. UNIX is a registered trademark of The Open Group in the United States and other countries.) With all of these powerful features available, however, there does not yet exist a system and method to maximize cost avoidance through intelligent and automated workload relocation in virtualized environments.

Accordingly, there exists a need in the art to overcome the deficiencies and limitations described hereinabove.

SUMMARY OF THE INVENTION

In a first aspect of the invention a method comprises monitoring a utilization amount of resources within logical partitions (LPARs) of a plurality of servers and identifying a resource-strained server of the plurality of servers, wherein the resource-strained server includes a plurality of LPARs. Additionally, the method comprises determining a migration of one or more LPARs of the plurality of LPARs of the resource-strained server and migrating the one or more LPARs of the resource-strained server to another server of the plurality of servers based on the determining to avoid an activation of capacity upgrade on demand (CUoD).

In a further aspect of the invention, a method comprises providing a computer infrastructure. The computer infrastructure is operable to monitor a utilization amount of resources within logical partitions (LPARs) of a plurality of servers and identify a resource-strained server of the plurality of servers, wherein the resource-strained server includes a plurality of LPARs. Additionally, the computer infrastructure is operable to determine a migration of one or more LPARs of the plurality of LPARs of the resource-strained server and migrate the one or more LPARs of the resource-strained server to another server of the plurality of servers based on the determining to avoid or minimize an activation of capacity upgrade on demand (CUoD).

In an additional aspect of the invention, a computer program product comprises a computer usable medium having computer readable program code embodied in the medium. The computer readable program code is operable to monitor utilization amounts of resources within logical partitions (LPARs) of a plurality of servers and identify a resource-strained server of the plurality of servers, wherein the resource-strained server includes a plurality of the LPARs. Additionally, the computer readable program code is operable to determine whether a migration of one or more LPARs of the resource-strained server to another server of the plurality of servers would avoid or minimize an activation of capacity upgrade on demand (CUoD). Furthermore, if the migration of the one or more LPARs of the resource-strained server to the other server of the plurality of servers would avoid or minimize an activation of the CUoD, the computer readable program code is operable to perform the migration of the one or more LPARs of the resource-strained server to the other server.

In a further aspect of the invention, a system comprises a monitoring tool configured to monitor utilization amounts of resources within a plurality of logical partitions (LPARs) of a plurality of servers and identify a resource-strained server of the plurality of servers, wherein the resource-strained server includes a plurality of LPARs. Additionally, the system comprises an optimization tool configured to determine a migration of one or more LPARs of the plurality of LPARs of the resource-strained server and migrate one or more LPARs of the resource-strained server to another of the plurality of servers to avoid or minimize an activation of capacity upgrade on demand (CUoD).

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for cost optimization in virtualized computing environments, and more particularly a system and method for cost-optimized configuration of virtual servers and resources (through cost avoidance) through the automated movement of applications, deactivation of unused resources, and disabling of supplemental resources. According to an aspect of the invention, a process is followed to minimize Capability on Demand (CUoD) from being initiated by automating migration of workload across separate physical systems. The invention integrates current enabling art including (but not limited to) partitioning, virtualization, and capacity on demand features to enhance them with new logic in order to obtain the most cost effective computing environment.

By implementing the invention, the initiation of CUoD may be avoided, thus optimizing costs through avoidance of costs associated with initiating CUoD. That is, using the present invention, for example, a customer or user of an LPAR may avoid initiating CUoD by the automated movement of applications, deactivation of unused resources, and disabling of supplemental resources. By avoiding initiation of CUoD, a customer may optimize costs through avoidance of the costs associated with initiating CUoD.

It should be noted that, while this invention will focus specifically on tools and enablement within UNIX environments, as this is an area of rapid growth for such technical enablement, the invention contemplates utilization within a plurality of computing environments. It should be further noted that CUoD is an IBM term, and analogous functions have been, and are being, introduced by competitors under differing names. The functionality described herein is applicable to those competing, analogous technologies as well.

System Environment

Figure 1:
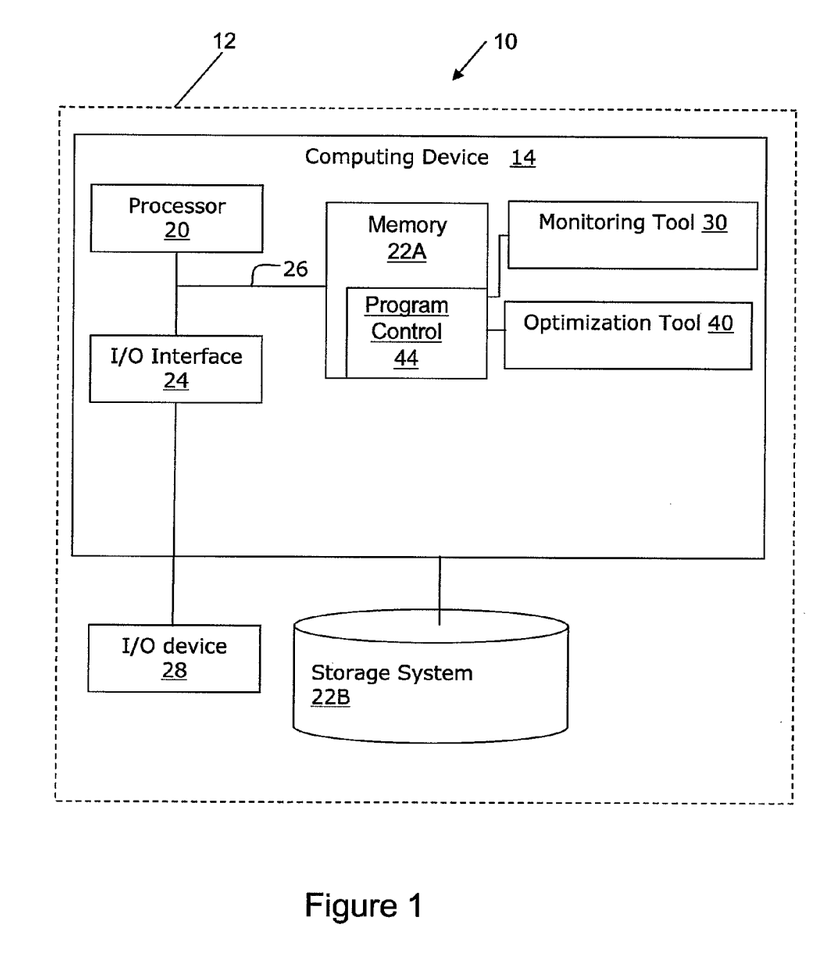
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a monitoring tool 30 configured to monitor resource usage on servers, and an optimization tool 40 configured to determine and execute, e.g., LPAR migrations that may reduce strained resources.

The computing device 14 includes a processor 20, a memory 22A, an input/output (I/O) interface 24, and a bus 26. Further, the computing device 14 is in communication with an external I/O device/resource 28 and a storage system 22B. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The processor 20 executes computer program code (program control 44), which is stored in memory 22A and/or storage system 22B. While executing computer program code, the processor 20 can read and/or write data to/from memory 22A, storage system 22B, and/or I/O interface 24. The computer program control 44 executes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the processes described herein. Further, while performing the processes described herein, one or more computing devices in the computer infrastructure 12 can communicate one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and/or support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

Capacity Upgrade on Demand (CUoD)

As discussed above, servers may be installed with capacity upgrade on demand (CUoD). CUoD allows a user to, e.g., purchase extra resource capacity, for example, if a user's overall needs have grown or during periodic times of increased resource use. In order to activate CUoD, a user may either rent, lease or buy the CUoD from a service provider. Additionally, CUoD may be activated in increments or activated for discrete durations. However, if the duration is too long, then the user may be required to purchase the CUoD. In embodiments, CUoD may be activated for a single type of resource or multiple types of resources. If a user determines that CUoD should be activated, the user may activate available CUoD resources to add capacity.

Figure 2:
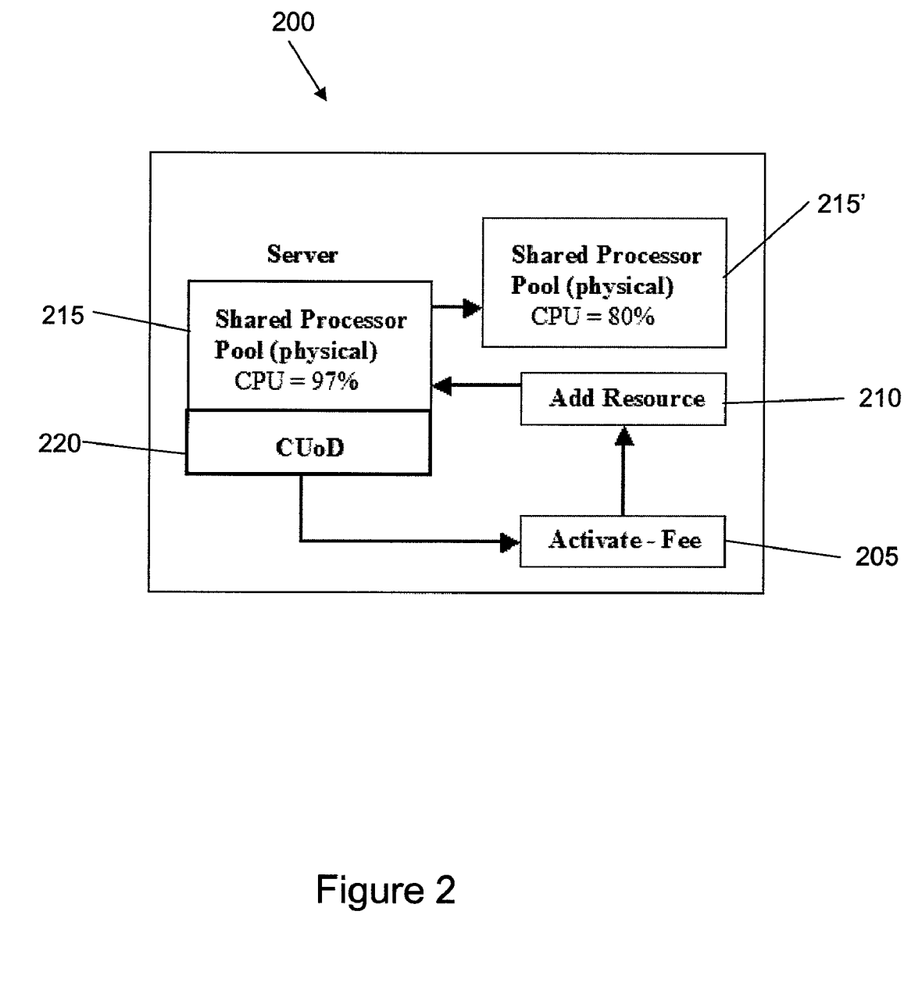
FIG. 2 shows an exemplary illustration of a capacity upgrade on demand (CUoD) process in accordance with the invention.

FIG. 2 depicts an exemplary CUoD activation process 200 for a server 215. As shown in FIG. 2, server 215 is currently utilizing ninety-seven percent of the CPU resource. Thus, there currently is not much spare CPU resource available. If, for example, the server user, owner or service provider anticipates, e.g., impending additional CPU resource usage, the current CPU resources of server 200 may be exhausted, and thus unable to provide the needed resources. Accordingly, for example, a server user, owner or service provider may opt to activate the CUoD 220.

In embodiments, a CUoD activation process 200 may be performed automatically or manually. Whether automated or manual, however, the CUoD activation process 200 includes the steps as depicted in FIG. 2. The activation process 200 may begin with the realization that additional resources are required. At step 205, activation credentials may be acquired to enable additional resources, at which point CUoD fee processing begins. At step 210, the activated resources are added to the shared resource pool. Then, as shown in FIG. 2, the resources are made available to the system partitions of the SPP (shown as configuration 215'), which causes the previous CPU utilization rate to be reduced from ninety-seven percent to eighty percent. This process may be repeated multiple times during a twenty-four hour period and may result in the activation of multiple resources and types of resources. Where unused resources are available within the computing environment, this process can incur substantial and unnecessary activation and usage costs.

Monitoring Tool

According to an aspect of the invention, the monitoring tool 30 tracks utilization of physical resources within virtualized environments. More specifically, the monitoring tool 30 provides the basis for the optimization tool 40 to manage a plurality of participating physical servers such that workloads can be moved between physical servers to reduce or avoid CUoD processing costs, as discussed further below.

According to an aspect of the invention, the monitoring tool 30 may comprise a lightweight agent deployed within each LPAR on each physical server, and may monitor only those items of interest to the optimization tool 40 (described below). In embodiments, the agent may acquire information by monitoring processor loads, I/O loads, etc. Moreover, software may run the agent in each LPAR for monitoring that LPAR.

In the event of a strained-resource condition on a server, an agent may indicate to the monitoring tool 30 the current strained-resource condition. Additionally, the agent of an LPAR on a server may communicate with other agents on the server (e.g., the agents of the other LPARs of the server). Moreover, an agent of one server may communicate With agents of LPARs of another server to, e.g., share resource usage information between the agents.

In another embodiment, the monitoring tool 30 may collect data from a plurality of existing monitoring applications and tools such as IBM Performance Toolbox, Tivoli® Netview, Topas, Hypervisor and other such tools. (Tivoli is a registered trademark of International Business Machines Corporation in the United States, other countries, or both.) As an example, with the IBM AIX® version 5L operating system, the Topas command is able to collect statistics with respect to utilization of both physical and virtual resources. (AIX is a registered trademark of International Business Machines Corporation in the United States, other countries, or both.)

In embodiments, using this collected data, it is possible for the monitoring tool 30 to not only detect the utilization of the physical resources within a physical server, but also determine the relative contribution of each individual LPAR and associated virtual devices to the overall utilization. In embodiments, the monitoring tool 30 may monitor resource utilization of servers in real-time or on a set schedule. In embodiments, the time period for the set schedule may be configurable by, e.g., the user or a service provider.

Figure 3:
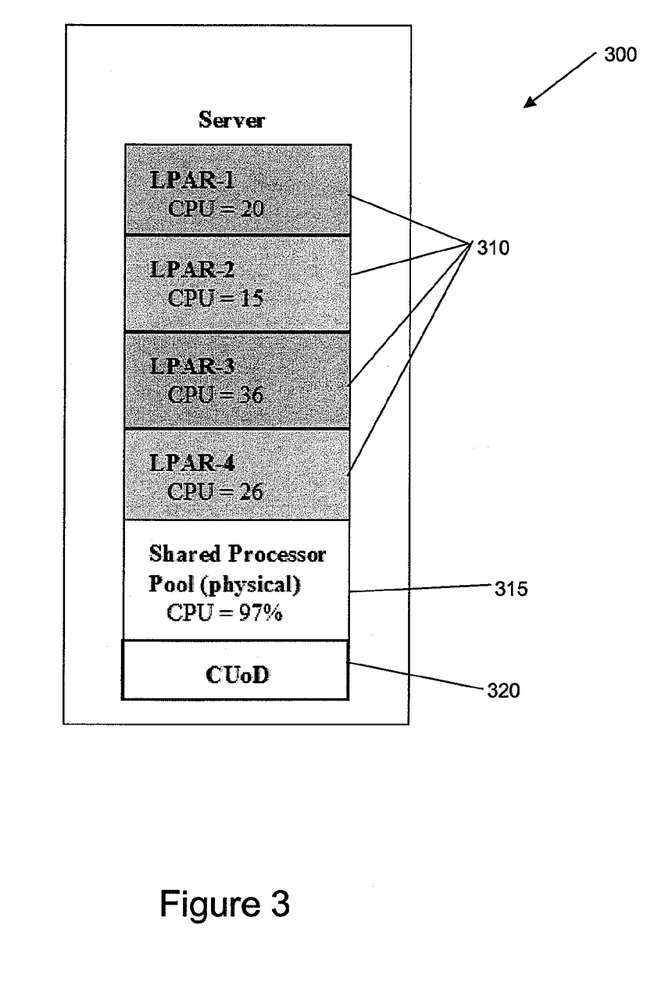
FIG. 3 shows an exemplary depiction of server resource utilization in accordance with the invention.

FIG. 3 shows an example of monitoring of physical and virtual CPU resources within a single physical server 300, as provided by the monitoring tool 30. With this example, the server 300 includes four logical partitions (LPARs) 310. As shown in FIG. 3, the monitoring tool 30 has determined the utilization of the shared processor pool for each LPAR 310. Thus, with the example of FIG. 3, LPAR-1 is currently utilizing twenty percent of the total processing pool of the server 300 and LPAR-4 is currently utilizing twenty-six percent of the total processing pool of the server 300.

Additionally, as shown in FIG. 3, the monitoring tool 30 detects the shared processor pool (SPP) 315 of server 300. Thus, with this example, all of the LPARs 310 of server 300 are utilizing ninety-seven percent of the total SPP 315 of server 300. Moreover, as shown in FIG. 3, server 300 includes capacity upgrade on demand (CUoD) 320. That is, server 300 includes additional capacity that may be activated by the user, e.g., manually or automatically at an additional cost to the user.

As shown in FIG. 3, with this example, the monitoring tool 30 has determined that the shared physical CPUs in server 300 are ninety-seven percent utilized, with each LPAR reporting its relative contribution to that overall utilization of the shared processor pool (SPP). Two considerations may be derived from this diagram as follows:

1) The physical server CPU resources are ninety-seven percent utilized, which may trigger the activation of CUoD resources to provide additional capacity; and 2) Each LPAR can be evaluated for action based on relative contribution to overall utilization of the physical server resources.

As discussed further herein, after the monitoring tool 30 determines the utilization of server resources, the optimization tool 40 may determine whether a logical partition should be, for example, migrated to another physical server resource or whether a Capacity Upgrade on Demand (CUoD) should occur.

In embodiments, when monitoring computing resources, four system elements may be considered, including: 1) CPU; 2) memory; 3) I/O (including paging to disk, memory read/writes etc); and 4) network (data to/from logical VIOS), amongst other system elements. As discussed with the example of FIG. 3 (which only included CPU resources), each of these system elements can be monitored at both the physical and logical layers.

Figure 4:
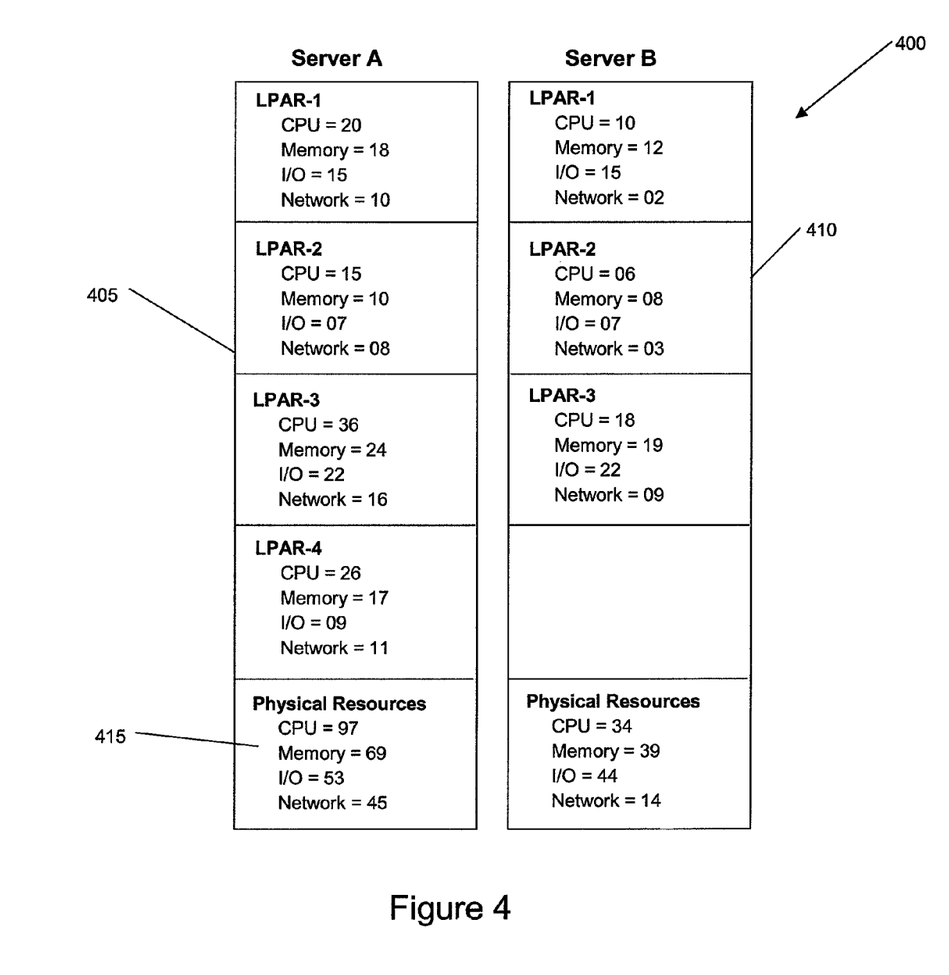
FIG. 4 shows an exemplary depiction of server resource utilization of two servers in accordance with the invention.

FIG. 4 shows an example 400 of two physical servers and their respective LPAR driven workloads in each of the major system element utilization metrics (e.g., CPU, memory, I/O and network). Additionally, as shown in FIG. 4, the monitoring tool 30 has determined the total utilization of the resources, as indicated by the physical resources summary 415.

As shown in FIG. 4, with this example, physical Server A 405 has four LPARs, whereas physical Server B 410 has three LPARs. Additionally, physical resources on Server A 405 are more highly utilized than those on Server B 410. In particular, by utilizing ninety-seven percent of CPU resources, Server A has almost exhausted active CPU resources, and thus the CPU resource may be constrained. Thus, it may be desirable to take action based on this strained-resource condition. It should be understood that, in embodiments, the level of resource usage that constitutes resource strain may be user configurable. That is, the point at which a resource may be deemed strained, and thus may benefit from an LPAR migration, may differ for different users, different resource types, and different operating systems, amongst other variables. Thus, a user, service provider, etc., may configure the monitoring tool 30 to vary the value for detection of a strained resource.

According to the invention, data collected by the monitoring tool 30 may not immediately effect an activation of CUoD resources. Rather, data collected by the monitoring tool 30 may be forwarded to the optimization tool 40 where evaluation, decision, and action may be executed.

Optimization Tool

In embodiments, the optimization tool 40 collects real-time utilization data and retains historical data, e.g., in summary, rather than detail form. Historical data may be used in a self-learning feedback loop to the optimization tool 40, such that over time, recurring workloads would be well understood (e.g., application xyz historically will increase CPU utilization by twenty-five percent for two hours). In any case, the optimization tool 40 evaluates real-time data (in conjunction with historical data where available), in order to make a determination of what, if any, action is required.

Continuing with the example systems depicted in FIG. 4, in the event that Server A 405 had triggered an evaluation event for CPU utilization, e.g., via the monitoring tool 30, the optimization tool 40 evaluates current environment data in order to determine the most efficient and low cost reconciliation method. Activation of CUoD resources would be deferred in the server and the environment until absolutely necessary (cost avoidance).

Figure 5:
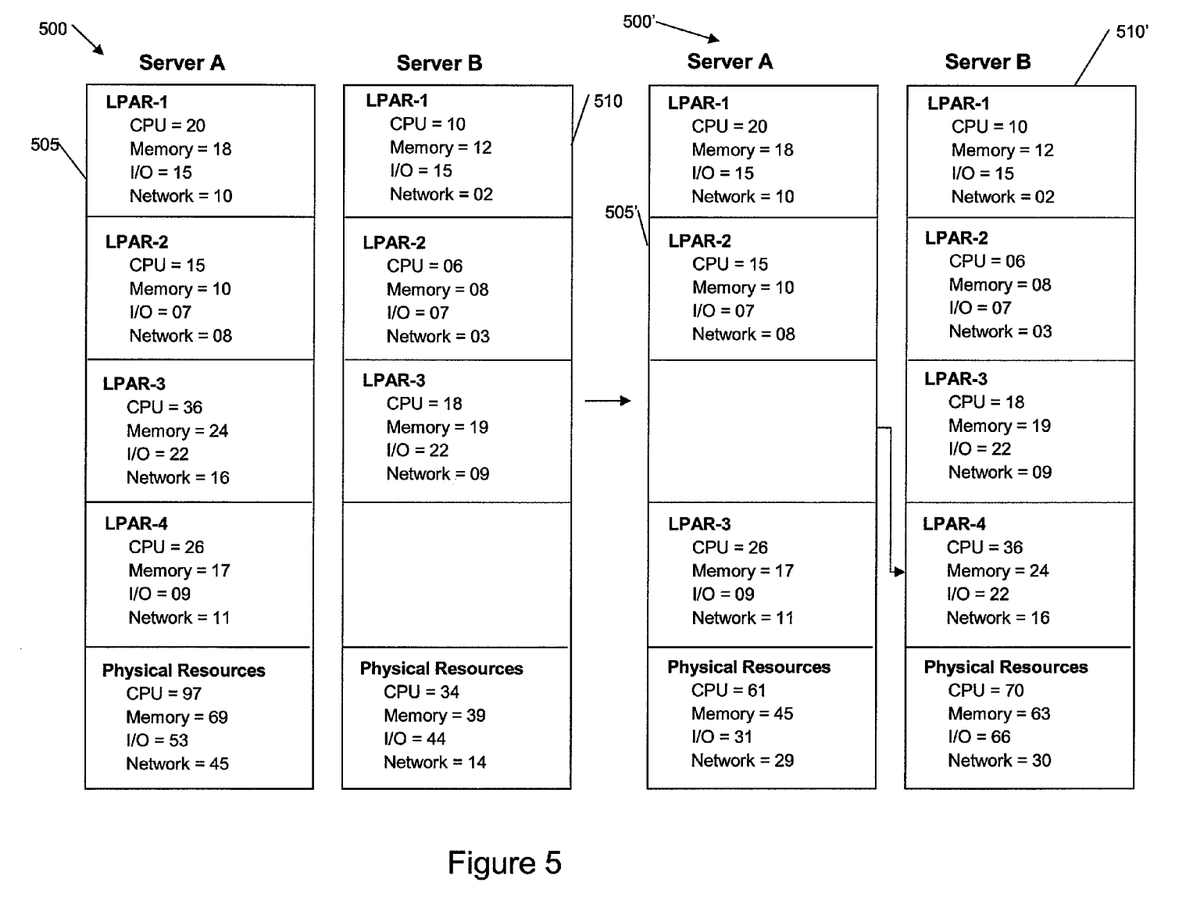
FIG. 5 shows an exemplary logical partition (LPAR) migration in accordance with the invention.

FIG. 5 depicts an exemplary LPAR migration in accordance with an aspect of the invention. The optimization tool 40 may direct an LPAR migration based upon the servers' current usage of resources, as determined by the monitoring tool 30. As shown in FIG. 5, with this example, the detection of a physical CPU resource depletion on Server A 505 by the monitoring tool 30 has triggered an LPAR migration event.

According to an aspect of the invention, with the example of FIG. 5, the optimization tool 40 conducts an evaluation of the servers (e.g., Server A 505 and Server B 510) and determines that there is no need to activate CUoD resources on Server A 505 because there is currently sufficient excess capacity in the computing environment to accommodate the server A workload. That is, the computing environment 500 includes both Server A 505 and Server B 510. Moreover, while Server A 505 is currently close to maximum CPU capacity, as shown in FIG. 5, the monitoring tool 30 has determined that Server B 510 is currently operating with excess resource capacity. For example, Server B 510 has currently utilized thirty-four percent of its CPU resources.

In response to a detection by the monitoring tool 30 of a constrained resource, the optimization tool 40 may determine whether to move an LPAR to another suitable server or to activate CUoD. In embodiments, the optimization tool 40 may identify an LPAR on the resource-strained server whose movement to another server would alleviate the resource strain. That is, if, for example, the CPU resource is strained on a server, the optimization tool may iterate through the possible, LPAR movements that may alleviate the strain. In embodiments, the optimization tool 40 may iterate through the possible LPAR migrations, starting analysis with an LPAR on the resource-strained server having the highest amount of the strained resource.

In embodiments, the optimization tool 40 may determine a server that is not constrained by the same resource as the resource-constrained server, and may calculate the resource usage on server if an LPAR from the resource-constrained server is moved. That is, the optimization tool may calculate a sum total of each of the resources on each of the servers that would result if the LPAR is moved.

Additionally, the optimization tool 40 may determine if the LPAR movement to another server would cause a strain for another resource in the server. That is, in embodiments, each time the optimization tool 40 performs an analysis, the optimization tool 40 reviews not only the constrained resource, but also the other system resources, such that it would not move a processor constrained LPAR onto a memory constrained server, for example, where the end result may be that performance would not improve. That is, if a movement of an LPAR to another server would alleviate the strain on a resource-constrained server for a particular resource type, but cause a resource strain for another resource type on the other server, the LPAR movement may not be suitable or a best option for cost avoidance.

Accordingly, if the optimization tool 40 determines that a proposed LPAR movement to another server, while alleviating a resource-strain on a resource-constrained server, would cause a resource strain on the other server, the optimization tool 40 may select another LPAR of the resource-constrained server for analysis. Additionally and/or alternatively, the optimization tool 40 may select another server for analysis. That is, the optimization tool 40 may analyze a movement of the same LPAR of the resource-constrained server to another server. With each iteration, the optimization tool 40 may stored the determined proposed physical resource totals (e.g., the respective sums for the utilized resources in each LPAR) for each of the servers in a database in, e.g., the storage system 22B of FIG. 1.

Once the optimization tool 40 determines that an LPAR migration should be performed, the optimization tool 40 may execute the LPAR migration. To execute the LPAR migration, in embodiments, for example, the optimization tool 40 may utilize the agents located in each LPAR or an LPAR-agent distributed system.

Thus, after evaluating options, with the example of FIG. 5, the optimization tool 40 determines that the best course of action to alleviate the strain of resources in configuration 500 is to move Server A—LPAR 3 and its workload to Server B 510. Configuration 500' of FIG. 5 depicts the re-balance of the computing environment applications and resources after the automated partition migration of LPAR 3 from Server A to Server B. As shown in the example of FIG. 5, following the partition migration event, both Severs A 505' and B 510' in configuration 500' are below all resource constraint triggering activity levels and no CUoD resources (with associated cost) need be to activated. Thus, costs are optimized through avoidance of CUoD activation. Additionally, as shown in FIG. 5, the LPARs on each server have been renumbered to reflect the LPAR migration performed by the optimization tool 40.

However, in embodiments, it may be acceptable, based on application and/or historical characteristics, to allow for a potential constraint. For example, a CPU-constrained LPAR may be migrated to an I/O-constrained server that has excess CPU cycles if the LPAR being migrated has very low I/O requirements. In embodiments, this information may be determined using the historical data collected by the monitoring tool 30 and stored in a database, e.g., the storage system 22B of FIG. 1.

Other Embodiments

While the above examples illustrate a logic flow enabled by this invention, the invention contemplates multiple additional logic flows. For example, in situations, the optimization tool 40 may determine that the best course of action would be an LPAR exchange. An LPAR exchange event may occur when the optimization tool 40 determines that cost avoidance is possible (or best achieved) by exchanging LPARs between physical servers.

Figure 6:
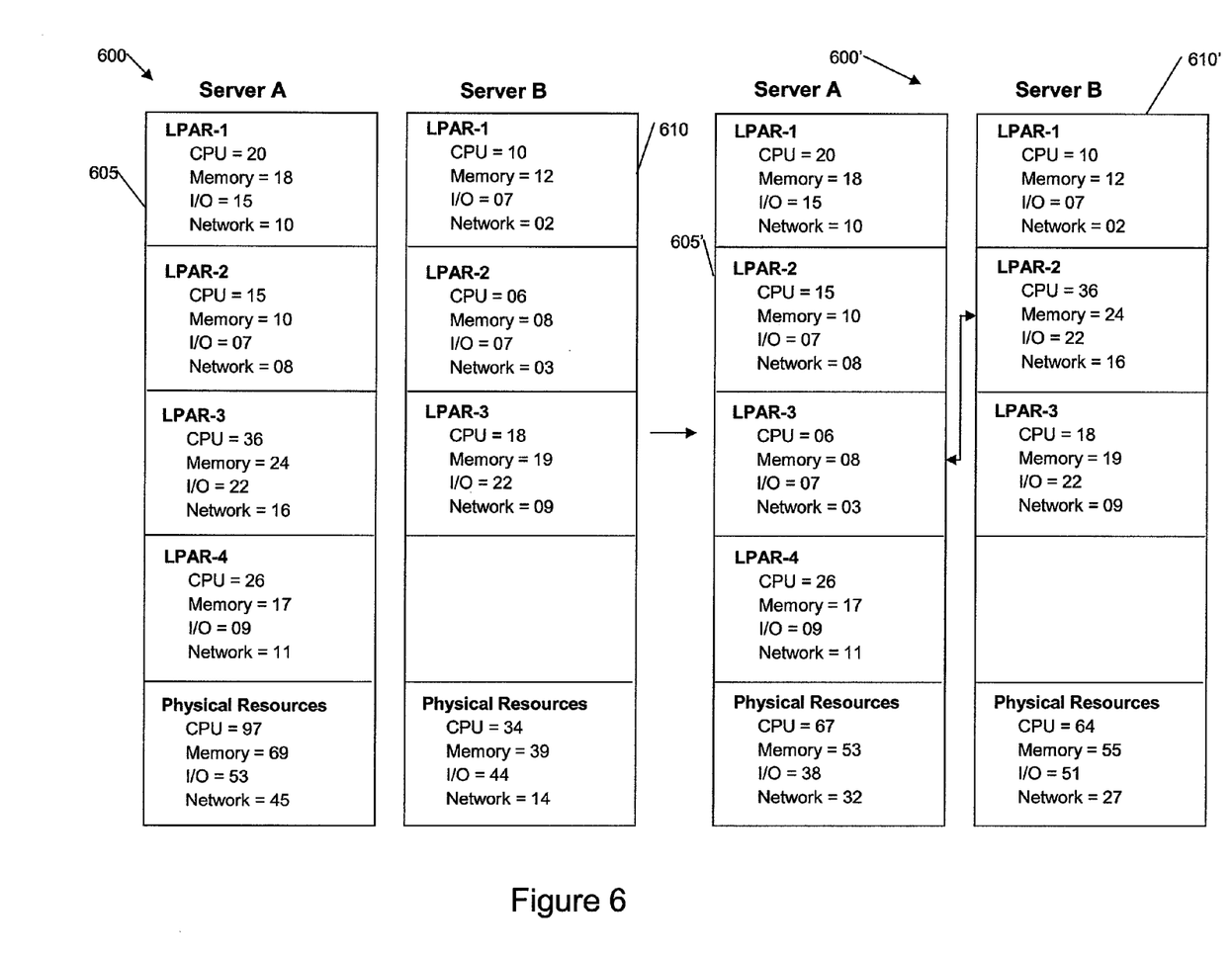
FIG. 6 shows an exemplary logical partition (LPAR) exchange in accordance with the invention.

FIG. 6 shows an example of an LPAR exchange in accordance with an aspect of the invention. As shown in FIG. 6, an exchange of Server A LPAR-3 with Server B (610) LPAR-2 would bring each of the physical servers very close to having the same performance characteristics. That is, as shown in FIG. 6, with configuration 600, the servers are somewhat unbalanced, with server A 605 consuming more CPU resources, memory resources, I/O resources and network resources. However, with the configuration 600', wherein the LPAR exchange has been executed, the resource usages of each of the servers 605' and 610' is more balanced between the servers. It should be noted that when the LPARs are moved between servers, the numbering of the LPARs may automatically update. Additionally, the invention contemplates that even when an exchange may cause a short period of lesser performance on one of the physical servers, if the ultimate result is balanced and unconstrained processing on both physical servers (without activation of new resources, e.g., CUoD), this may be acceptable.

In embodiments, an LPAR or server that has already activated CUoD resources may be on the top of the priority list to migrate, and thus deactivate the CUoD resources (and eliminate associated costs). Thus, the optimization tool 40 may prioritize LPAR movement such that those servers that have already activated CUoD be considered first for migration to another server.

Additionally, the cost of enabling CUoD resources may be less expensive on one server than on another. In an embodiment, either independently, or in conjunction with the techniques already described, the optimization tool 40 may attempt to move an LPAR requiring additional resources to specific servers such that the lowest cost available CUoD resources would be enabled.

Furthermore, the invention contemplates that, where there is not a good match or scenario for LPAR migration or exchange, the optimization tool 40 may provide for an application migration or exchange. Using this method, the optimization tool 40 may perform further analysis of each LPAR's workload and determine which specific applications are driving the workload. This application data, for example, may easily be collected from the operating system process tables, and a myriad of monitoring tools. Using this data, the optimization tool 40 may determine that it is desirable to move one or more applications from one server to another or to exchange applications between servers. Additionally, the invention contemplates that, in embodiments, application migration may be the first attempted method and LPAR migration may be the second attempted method.

Flow Diagram

Figure 7:
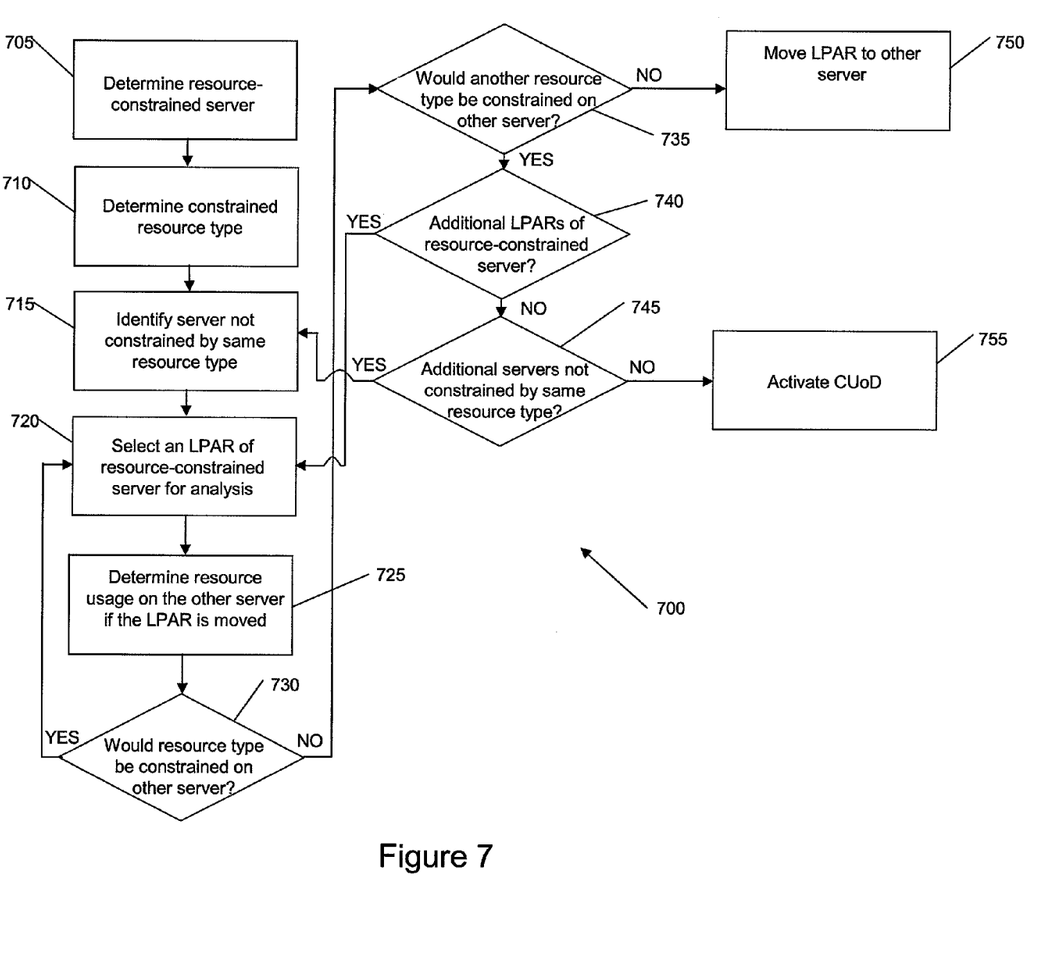
FIG. 7 shows a flow diagram implementing processes in accordance with aspects of the invention.

FIG. 7 is a flow diagram 700 for implementing processes of the invention, which may be implemented in the environment of FIG. 1. FIG. 7 equally represents a high-level block diagram of the invention. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As shown in FIG. 7, at step 705, the monitoring tool identifies a resource-constrained server. At step 710, the monitoring tool identifies the type of resource that is constrained on the resource-constrained server. At step 715, the optimization tool identifies another server that is not constrained by the same resource type. At step 720, the optimization tool selects an LPAR of the resource-constrained server for analysis. At step 725, the optimization tool determines the resource usage on the servers if the LPAR is moved to another server. At step 730, the optimization tool determines whether the resource constrained on the resource-constrained server would be constrained on the other server. If, at step 730, the optimization tool determines that the resource constrained on the resource-constrained server would still be constrained on the other server if the LPAR migration were to be carried out, the process may continue at step 720, where another LPAR of the resource-constrained server is selected for analysis.

If, at step 730, the optimization tool determines that the resource constrained on the resource-constrained server would not be constrained on the other server if the LPAR migration were to be carried out, at step 735, the optimization tool determines whether carrying out the LPAR migration would result in another resource being constrained on the other server. If, at step 735, the optimization tool determines that the proposed LPAR migration would not result in another resource being constrained on the other server, at step 750, the optimization tool may migrate the LPAR from the resource-constrained server to the other server.

If, at step 735, the optimization tool determines that the proposed LPAR migration would result in another resource being constrained on the other server, at step 740, the optimization tool may determine if there are additional LPARs for analysis on the resource-constrained server. If, at step 740, the optimization tool determines that there are additional LPARs of the resource-constrained server for analysis, the process continues at step 720. If, at step 740, the optimization tool determines that there are no additional LPARs of the resource-constrained server for analysis, at step 745, the optimization tool determines if there are additional servers for analysis that are not constrained by the same resource type. If, at step 745, the optimization tool determines that there are additional servers for analysis that are not constrained by the same resource type, the process continues at step 715, where another server is analyzed for an LPAR migration. If, at step 745, the optimization tool determines that there are no additional servers for analysis that are not constrained by the same resource type, at step 755, the optimization tool may activate CUoD.

It should be understood, that while the steps have been described as occurring in a particular order, the invention contemplates that the steps may be performed in other orders. For example, in embodiments, step 715 may be performed after step 720. Additionally, in embodiments, the optimization tool 40 may iterate through each of the possible LPAR migrations and calculate a resource total for each iteration prior to performing an LPAR migration. In embodiments, the calculated resource totals may be stored in a database, e.g., in the storage system 22B of FIG. 1. Moreover, as discussed above, the optimization tool 40 may determine that an LPAR exchange may best optimize the servers. Furthermore, the invention contemplates that, in embodiments, steps may be implied or omitted while still remaining true to this invention.

While the invention has been described in terms of embodiments, those skilled in the art will recognize that the invention can be practiced with modifications and in the spirit and scope of the appended claims.

What is claimed is:

1. A method, comprising:
    monitoring utilization amounts of resources within logical partitions (LPARs) of a plurality of servers;
    identifying a resource-strained server of the plurality of servers, wherein the resource-strained server includes a plurality of the LPARs;
    determining a migration of one or more LPARs of the plurality of LPARs of the resource-strained server; and
    migrating the one or more LPARs of the resource-strained server to an other server of the plurality of servers based on the determining to avoid an activation of capacity upgrade on demand (CUoD), wherein:
    at least one of the monitoring, identifying, determining, and migrating are performed by a computer device.

2. The method of claim 1, wherein the resources comprise at least one of a CPU resource, a memory resource, an input/output (I/O) resource, and a network resource.

3. The method of claim 1, wherein the identifying comprises:
    summing the utilization amounts of the resources, by resource type, of the one or more LPARs of at least one server of the plurality of servers; and
    determining if any of the utilization amounts of the resources have exceeded a predetermined amount.

4. The method of claim 1, wherein the monitoring comprises utilizing an agent located on each of the LPARs of the plurality of servers.

5. The method of claim 1, wherein the determining comprises:
    identifying a resource type that is strained on the resource-strained server; and
    identifying the other server of the plurality of servers that is not strained by the resource type.

6. The method of claim 5, wherein the determining further comprises:
    selecting an LPAR of the plurality of LPARs of the resource-strained server for analysis;
    calculating resulting resource usages encountered on the other server by migrating the LPAR to the other server; and
    storing the resulting resource usages.

7. The method of claim 6, wherein the determining further comprises:
    selecting each of the LPARs of the plurality of LPARs of the resource-strained server for analysis;
    calculating resulting resource usages encountered on the other server by migrating the each of the LPARs individually to the other server; and
    storing the resulting resource usages.

8. The method of claim 6, wherein the determining further comprises:
    reviewing the stored resulting resource usages; and
    identifying a suitable resulting resource usage from the stored resulting resource usages that indicates a desired resource usage for each of the resources.

9. The method of claim 8, wherein the desired resource usage is at least one of:
    the resulting resource usage for the each of the resources which is below a respective predetermined resource strain level; and
    the resulting resource usage for the resource type that is strained which is below the respective predetermined resource strain level.

10. The method of claim 1, wherein the migration comprises an LPAR exchange.

11. The method of claim 1, wherein the determining further comprises prioritizing for the migration a server of the plurality of servers having CUoD currently activated.

12. The method of claim 1, wherein the determining further comprises:
    determining a server of the plurality of servers having lowest cost CUoD resources; and
    prioritizing the server having the lowest cost CUoD resources for migration of the one or more LPARs of the resource-strained server thereto.

13. The method of claim 1, wherein a service provider at least one of deploys, creates, maintains and supports a computer infrastructure that performs the steps of claim 1.

14. The method of claim 1, wherein steps of claim 1 are provided by a service provider on a subscription, advertising, and/or fee basis.

15. A method for cost avoidance, comprising:
providing a computer infrastructure being operable to:
monitor utilization amounts of resources within logical partitions (LPARs) of a plurality of servers;
identify a resource-strained server of the plurality of servers, wherein the resource-strained server includes a plurality of LPARs;
determine a migration of one or more LPARs of the plurality of LPARs of the resource-strained server; and
migrate the one or more LPARs of the resource-strained server to an other server of the plurality of servers based on the determining to avoid or minimize an activation of capacity upgrade on demand (CUoD).

16. The method of claim 15, wherein the computer infrastructure is further operable to:
sum the utilization amounts of the resources, by resource type, of the one or more LPARs of at least one server of the plurality of servers; and
determine if any of the utilization amounts of the resources have exceeded a predetermined amount.

17. The method of claim 15, wherein the computer infrastructure is further operable to:
identify a resource type that is strained on the resource-strained server;
identify the other server of the plurality of servers that is not strained by the resource type;
select an LPAR of the plurality of LPARs of the resource-strained server for analysis;
calculate resulting resource usages encountered on the other server by migrating the LPAR to the other server; and
store the resulting resource usages.

18. The method of claim 15, wherein the computer infrastructure is created, maintained, deployed and supported by a service provider.

19. A computer program product comprising a computer-readable storage medium having computer readable program code embodied in the medium to:
monitor a utilization amount of resources within logical partitions (LPARs) of a plurality of servers;
identify a resource-strained server of the plurality of servers, wherein the resource-strained server includes a plurality of the LPARs;
determine whether a migration of one or more LPARs of the resource-strained server to an other server of the plurality of servers would avoid or minimize an activation of capacity upgrade on demand (CUoD); and
if the migration of the one or more LPARs of the resource-strained server to the other server of the plurality of servers would avoid or minimize an activation of the CUoD, perform the migration of the one or more LPARs of the resource-strained server to the other server.

20. A system, comprising:
a computer device comprising:
a monitoring tool configured to:
monitor utilization amounts of resources within a plurality of logical partitions (LPARs) of a plurality of servers; and
identify a resource-strained server of the plurality of servers, wherein the resource-strained server includes a plurality of LPARs; and
an optimization tool configured to:
determine a migration of one or more LPARs of the plurality of LPARs of the resource-strained server; and
migrate one or more LPARs of the resource-strained server to another of the plurality of servers to avoid or minimize an activation of capacity upgrade on demand (CUoD).

21. The method of claim 1, further comprising analyzing a workload of the one or more LPARs and determining which applications are driving the workload.

22. The method of claim 21, wherein migrating the one or more LPARs that have an activated CUoD deactivates the activated CUoD.

* * * * *